US008463752B2

(12) United States Patent
Brinkmoeller et al.

(10) Patent No.: US 8,463,752 B2
(45) Date of Patent: Jun. 11, 2013

(54) RULE-BASED ANONYMIZER FOR BUSINESS DATA

(75) Inventors: Bernhard Brinkmoeller, Wiesloch (DE); Axel Herbst, Eppingen-Rohrbach (DE)

(73) Assignee: SAP AG, Walldorf (DE)

( * ) Notice: Subject to any disclaimer, the term of this patent is extended or adjusted under 35 U.S.C. 154(b) by 6 days.

(21) Appl. No.: 13/041,918

(22) Filed: Mar. 7, 2011

(65) Prior Publication Data
US 2012/0233129 A1 Sep. 13, 2012

(51) Int. Cl.
*G06F 7/00* (2006.01)
*G06F 17/00* (2006.01)

(52) U.S. Cl.
USPC ........................................................ 707/662

(58) Field of Classification Search
USPC .......................................... 707/662, 999.204
See application file for complete search history.

(56) References Cited

U.S. PATENT DOCUMENTS

| 7,181,017 | B1 * | 2/2007 | Nagel et al. .................. 380/282 |
| 2003/0014654 | A1 | 1/2003 | Adler et al. |
| 2004/0128302 | A1 | 7/2004 | Schirmer et al. |
| 2004/0210763 | A1 * | 10/2004 | Jonas ............................. 713/193 |
| 2006/0259954 | A1 * | 11/2006 | Patrick .............................. 726/2 |
| 2007/0255704 | A1 | 11/2007 | Baek et al. |
| 2007/0294308 | A1 * | 12/2007 | Megerian ...................... 707/200 |
| 2008/0301805 | A1 | 12/2008 | Bharara et al. |
| 2010/0042583 | A1 | 2/2010 | Gervais et al. |

FOREIGN PATENT DOCUMENTS

WO    WO 2010/028395    3/2010

OTHER PUBLICATIONS

European Search Report for EP 12 00 1525, dated Aug. 9, 2012.

* cited by examiner

*Primary Examiner* — Aleksandr Kerzhner
(74) *Attorney, Agent, or Firm* — Kenyon & Kenyon LLP

(57) ABSTRACT

A method of anonymize business data. The method includes responsive to a request from an application for data objects stored in a database system, retrieving the data objects from a non-transitory storage of the database system, prior to transmitting the data object to the application, retrieving pre-determined rules from a rule engine, wherein the rules include conditions for retaining data, comparing the request against the rules to determine portions of the data objects that are to be anonymized, anonymizing the portions of the data objects, and transmitting the data object to the application.

18 Claims, 7 Drawing Sheets

RULE-BASED ANONYMIZER FOR BUSINESS DATA

FIELD OF THE INVENTION

The present invention is directed to methods and systems for selectively anonymizing portions of stored business data to meet regulatory requirements, to prevent unauthorized access, and/or to select realistic but appropriate sample data for testing applications.

BACKGROUND

Business data stored in databases and archived in long-term storages may include a wide range of data objects. Some of the data objects may include information that is required by regulations to be treated in specific manners. Different regulations may have different objectives and thus different requirements on how to handle the business data. For example, privacy and protection laws may require that certain personal information be made inaccessible under certain conditions such as after a first stipulated period of time. On the other hand, security regulations such as tax law may require that financial records be preserved for a second stipulated period of time. Thus, a brute-force approach such as destroying the business data after the first speculated period of time to meet the requirements of the privacy and protection laws may not be appropriate since the business data may be required by security regulations to be preserved even after the first stipulated period of time.

Another issue associated with data protection is that business data may be accessed via a number of access paths. Thus, when the access to the business data is protected from one access path, it still may not be safe since the protection may be circumvented via other access paths.

A further issue relating to protecting business data in compliance with regulations is how to properly use existing business data as test data in business software development. Testing data is commonly used to test business software applications that are under development. The testing data may be simulated (or artificial) test data or real data extracted from business data. Testing the business software application using only simulated data, although convenient, can be unreliable since it does not reflect reality. To ensure the robustness of the business software applications, real data may be needed for testing. However, real test data extracted from existing business data may contain information whose usage is subject to government regulations and laws. For example, certain personal information may need to be anonymized in the test data under privacy and protection laws.

SUMMARY OF INVENTION

Therefore, there is a need for systems and methods that anonymize portions of data objects stored in database or data archive based on rules, where the anonymization may not be circumvented by alternative access channels and the rules are formulated in accordance with regulations. Anonymizing data may include redact and encrypt at least part of the data before it is provided to the requesting entity.

Embodiments of the present invention include a method of anonymizing business data. The method includes responsive to a request from an application for data objects stored in a database system, retrieving pre-determined rules from a rule engine, wherein the rules include conditions for retaining data, comparing the request against the rules to determine first portions of the data objects that are to be anonymized and second portions of the data objects that are not to be anonymized, retrieving second portions of the data objects from a non-transitory storage of the database system, anonymizing the first portions of the data objects, and transmitting the data object including the first and second portions to the application.

Embodiments of the present invention include a method of anonymizing business data. The method includes responsive to a request from an application for data objects stored in a database system, retrieving the data objects from a non-transitory storage of the database system, prior to transmitting the data objects to the application, retrieving pre-determined rules from a rule engine, wherein the rules include conditions for retaining data, comparing the request against the rules to determine portions of the data objects that are to be anonymized, anonymizing the portions of the data objects, and transmitting the data object to the application.

BRIEF DESCRIPTION OF THE DRAWINGS OF THE EXAMPLE EMBODIMENTS

DETAILED DESCRIPTION OF THE EXAMPLE EMBODIMENTS

Figure 1:
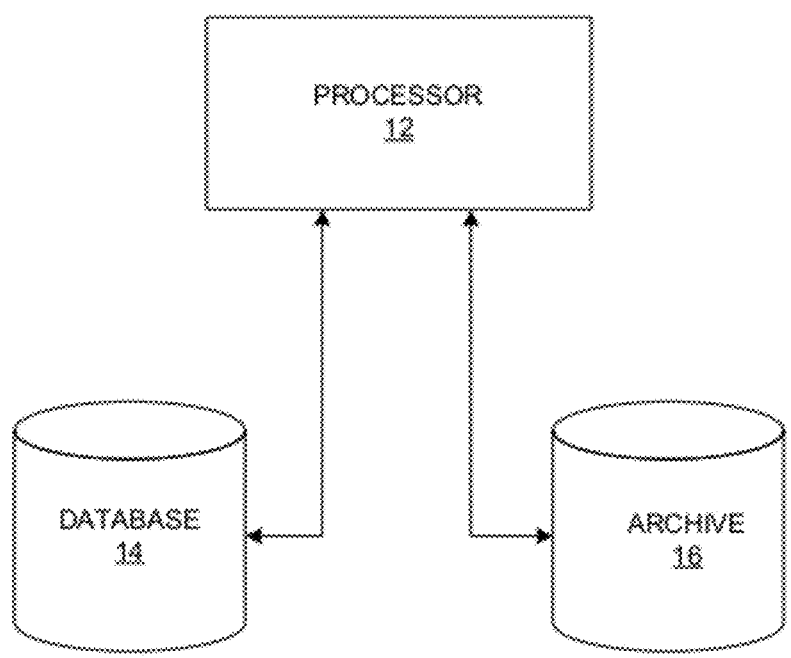
FIG. 1 illustrates an exemplary data storage system.

FIG. 1 illustrates an exemplary data storage system 10. The data storage system 10 may include a processor 12, a database system 14, and a data archive 16 for long-term data storage. The processor 12 may be a server computer that includes programmable hardware processors communicatively connected to the database system 14 and/or the data archive 16 via a communication network (not shown). Further, the processor 12 may be configured to run business applications that may access business data stored in the database 14 and/or the data archive 16 to support the operation of the business application. The database 14 may store business data that may be "alive" in the sense that the business data stored on the database system 14 may be supplemented, modified, and updated by the operation of the business application or other applications that may have access to the database system 14. The data archive 16 may store "permanent" data that may not be further supplemented, modified, or updated. However, the data stored in the data archive 16 may be accessed by the business application for other purposes such as retrieving historical data.

Figure 2A:
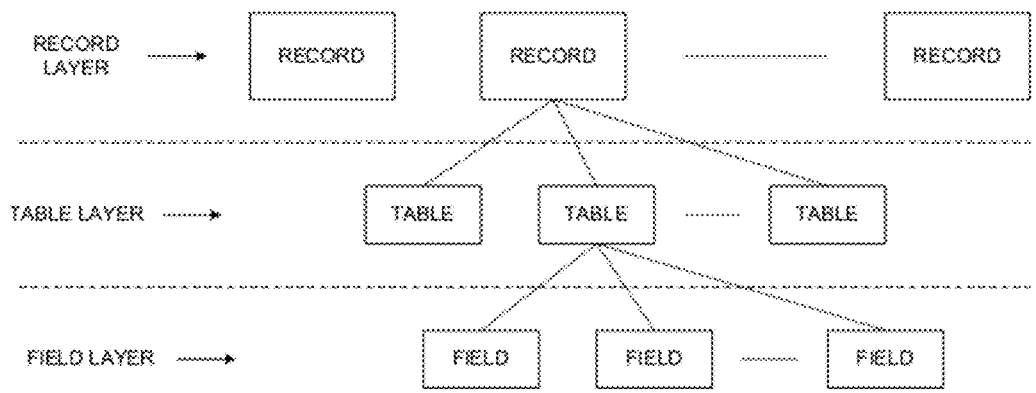
FIGS. 2A-2C illustrate exemplary organizations of business data stored in a database.
Figure 2B:
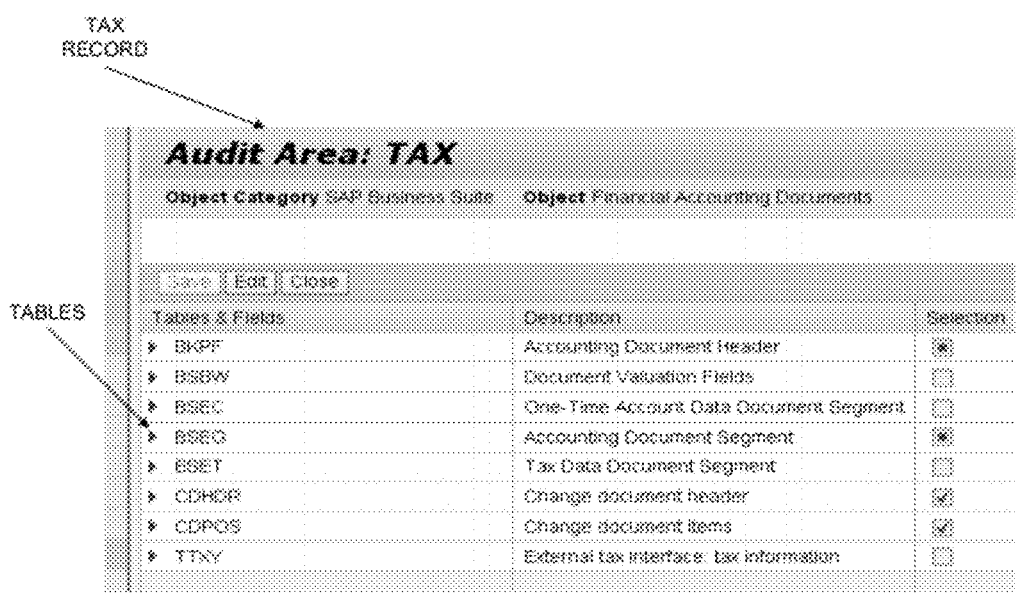
Figure 2C:
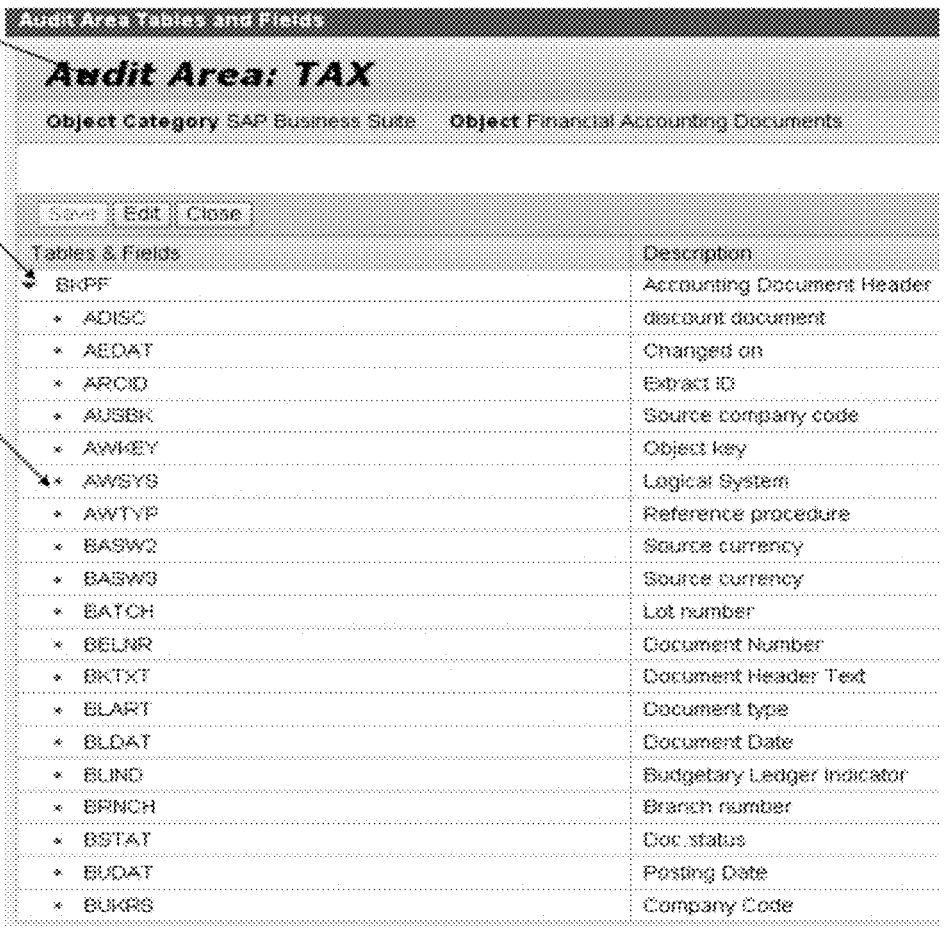

The business data stored on the database system 14 or the data archive 16 may be organized hierarchically. For convenience, business data organization is discussed in the context of a database. However, the organization may be similarly applied to a data archive. FIGS. 2A-2C illustrate exemplary organizations of business data stored in a database. Referring to FIG. 2A, FIG. 2A illustrates an exemplary hierarchy of business data stored in a database. The business data stored in the database may be hierarchically organized into layers. At the top layer (record layer), the database may include data objects of one or more records. At the second layer (table layer), each of the records may include data objects of one or more tables. At the third layer (field layer), each of the tables may include data objects of one or more data fields. Thus, the business data stored in the database may be searched through the hierarchy.

The records may include data fields that categorize and describe the record, and may further include identifiers to the tables associated with the records. FIG. 2B illustrates an exemplary record stored in the database. The record may include a record identifier "TAX" that may identify the record. The record may also include a first data object that categorizes the record. In the example as illustrated in FIG. 2B, the category may be an "SAP Business Suite." Further, the record may include a second data field that contains description of the record. In the example as illustrated in FIG. 2B, the description of the TAX record may be "Financial Accounting Documents." The content of the record may include one or more table identifiers which may be functioned to identify tables associated with the record and to link the record to these tables. In the example as illustrated in FIG. 2B, the record may include table identifiers such as from "BKPF" to "TTXY" which each may be associated with a short description of the table.

Each of the tables as illustrated in FIG. 2B may further include fields through field identifiers. FIG. 2C illustrates an exemplary record which includes a table identifier "BKPF" which further includes field identifiers from "ADISC" to "BUKRS." Each field may be associated with a short description. The field identifiers may identify data fields contained in the "BKPF" table and also provide a link through which the data values stored in the data fields may be accessed and retrieved.

To access and retrieve data stored in the database, a business application may send a query that identifies one of more data objects to the database. The data objects may include one of more records, tables, or fields. The query may be constructed in different ways using record identifiers, table identifiers, and/or field identifiers. For example, the query from the business application may include a list of records that the business application may request for access. In another example, the query from the business application may include a list of records and a list of tables within the records that the business application may request for access. Finally, the query from the business application may also include a list of fields in addition to the records and tables that the business application may request to access. Thus, as discussed above, certain portions or contents of the requested data objects may be prohibited from being disclosed to the business application in its original form because of the restrictions imposed by laws and regulations. Therefore, a robust and yet flexible system and method is needed to allow the access to business data stored on the database in compliance with regulations.

Figure 3:
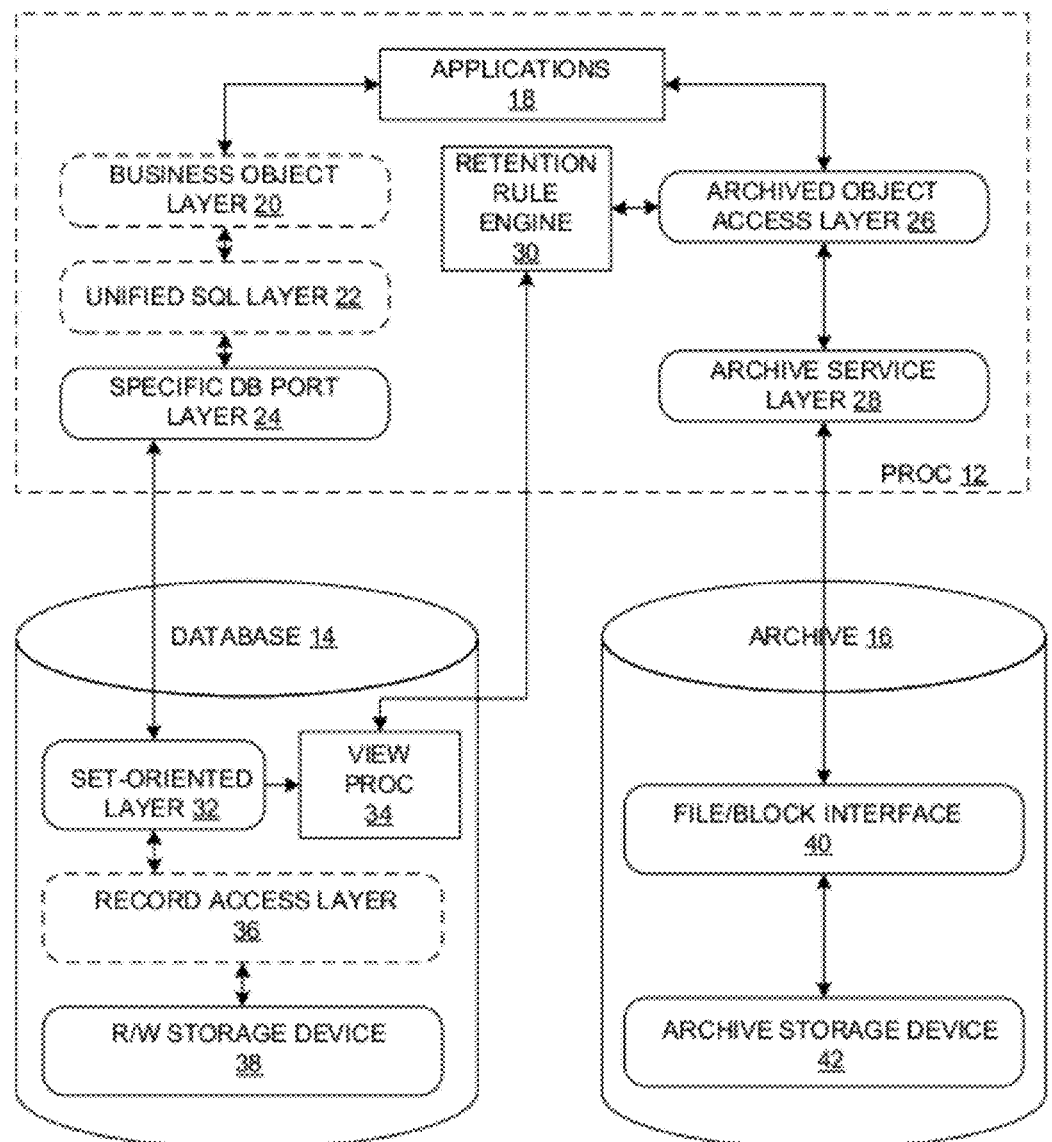
FIG. 3 illustrates a rule-based data anonymization system according to an exemplary embodiment of the present invention.

FIG. 3 illustrates a rule-based data anonymization system according to an exemplary embodiment of the present invention. As illustrated in FIG. 1, the rule-based data anonymization system may include a processor configured with business applications 18, a database system 14, and/or data archive 16. Additionally, the rule-based data anonymization system may also include a retention rule engine 30 configured by the processor 12. The retention rule engine 30 may specify a list of rules based on which the business data stored in the database 14 and/or data archive 16 may be accessed. To be effective, the retention rule engine may be coupled to the database system 14 and/or the data archive 16 at points that may not be circumvented. As to the database system 14, the retention rule engine 30 may be coupled to an access layer ("set-oriented layer 32") via a view processor 34 residing on the database 12. Thus, when a request for data is received by the set-oriented layer 32, the view processor 34 may check the data request against rules stored in the retention rule engine 30. As to the data archive, since the archived data may not be modified, the retention rule engine may be coupled to the immediate access layers to the data archive 16. In the exemplary embodiment, the retention rule engine 30 may be coupled to an archive object access layer 26 through which all business data stored on the data archive are accessed. Thus, requests for data stored in the data archive 16 may be checked against the rules stored in the retention rule engine.

FIG. 3 provides further details about the rule-based data anonymization system. To access data stored on the database system 14, the processor 12 may be configured with a first set of intermediate access layers through which applications 18 may access the database system 14. The first set of intermediate access layers may include a business object layer 20, a unified SQL layer 22, and a specific database port layer 24. The business object layer 20 may be coupled to the business applications 18 to map business objects into SQL objects. The specific database port layer 24 may translate SQL objects into queries that may be read by the database system 14. The database 14 may include a set-oriented layer 32, a view processor 34, a record access layer 36, and a read/write storage device 38. The view processor 34 may be a hardware processor that is configured to control the operation of the database system 14. The view processor 34 may control the data flow in and out of the database system 14 through the set-oriented layer 32. The read/write storage device 38 may physically store data objects that may be accessed and/or retrieved through the record access layer 36.

In one exemplary embodiment, applications 18 may send a request for data via the specific database port layer 24 to the set-oriented layer 32. The view processor 34 of the database system 14 may then check the request against rules stored in the retention rule engine to determine which portions of the requested data need to be anonymized and which portions of the requested data can be transmitted to the business applications 18 in their entirety. The portions may be identified by identifiers to one or more records, tables, and/or fields. Subsequently, the view processor may modify the request to the record access layer 36 to generate a modified data request for those portions of data that need not be anonymized to retrieve the data from the read/write storage device 38. Prior to transmitting the requested data back to the business applications, the view processor may execute an anonymizer to label those portions of business data that should be anonymized as anonymized. Subsequent to the anonymization, the view processor 34 may transmit the requested data to the business applications, in which the requested data may include portions that are anonymized. In this way, the process of data retrieval may be more efficient since the portions of data that are not anonymized are searched and retrieved from the read/write storage device.

In another exemplary embodiment, applications 18 may send a request for data via the specific database port layer 24 to the set-oriented layer 32 through which the requested data may be retrieved from the read/write storage device via the record access layer. Prior to transmitting the requested data to the applications 18, the view processor 34 may examine the requested data against all of the rules stored in the retention rule engine 30. If the view processor 34 determines that a portion of the retrieved data should be anonymized, the view processor 34 may anonymize the determined portion. The determined portion of data may be identified by identifiers to one or more records, tables, and/or fields. Further, directly examining the retrieved data may allow anonymization at an even finer grain of the retrieved data. For example, if the privacy data that should be anonymized such as a person's name is embedded in the text of a text document stored in a field, the view processor 34 may anonymize only the privacy data that violates the retention rules while keeping other text in the text file intact.

To access the data stored in data archive 16, the processor 12 may be configured with a second set of intermediate access layers through which applications 18 may access the data archive 16. The second set of intermediate access layers may include an archived object access layer 26 and an archived service layer 18. The archived object access layer 26 may be an access layer that all requests for archived data objects need to utilize to access data stored in the data archive 16. Further, the archived object access layer 26 may map requests for data from business applications 18 into requests for archived data objects. Thus, when the retention rule engine 30 is coupled to the archived object access layer 26 by the processor 12, the processor 12 may examine a request for data against rules stored in the retention rule engine 30 to determine portions of the requested data that should be anonymized and modify the request transmitted to the file/block interface of the data archive 16 so that portions that are not to be anonymized are retrieved from the archive storage device 42. The processor 12 may then execute an anonymizer program to label portions that should be anonymized as anonymized and the transmit the retrieved data to the applications 18.

Alternatively, the processor 12 may transmit the data request directly from the archived service layer 28 to the file/block interface 40 of the data archive 16 to retrieve the requested data from the archive storage device 42. Prior to transmitting the retrieved data to the applications 18, the processor may examine the retrieved data against rules stored in the retention rule engine 30 to determine which portions of the retrieved data should be anonymized. The determined portion of data may be identified by identifiers to one or more records, tables, and/or fields. Further, directly examining the retrieved data may allow anonymization at even finer grain of the retrieved data such as text embedded in an article. Following the determination, the processor 12 may execute an anonymizer to anonymize those determined portions of the retrieved data and then allow the applications 18 to access the retrieved data with the determined portions anonymized.

The rules stored in the retention rule engine may be predetermined by the users based on mandates imposed by laws and regulations. The rules may be formulated in different forms. Table 1 includes an exemplary embodiment of the rules that may be used in the present invention. Table 1 includes a "system" column indicating the database system, a "client" column indicating the identifier of the user, "file ID (to)" and "file ID (from)" columns indicating the range of files concerned, "min retention" and "max retention" columns indicating time spans of the file retention after the end of a fiscal year, "time unit" column" indicating units of time, "start time" column indicating a starting time from which the retention period starts, "anonymize file IDs" column indicating files to be anonymized after the retention period, and "anonymize content" column indicating contents such as keywords to be anonymized. The files here are used loosely and may refer to data objects such as records, tables, or fields. Each row of Table 1 may represent a rule stored in the retention rule engine. For example, row 1 of Table 1 may represent a rule that anonymizes files 001-003 10 years after a fiscal year ends. Row 2 of Table 1 may represent a rule that anonymizes field ("BUKRS") in the table ("BKPF") of files 004-005 five years after a fiscal year ends. Further, Row 3 of Table 1 may represent a rule that anonymize the "Key Words" contained in files 005-008 eight years after a fiscal year ends.

TABLE 1

| | System | Client | File ID (from) | File ID (To) | Min Reten | Max Reten | Time unit | Start time | Anonymize File IDs | Anonymize Content |
|---|---|---|---|---|---|---|---|---|---|---|
| 1 | QV5 | 339 | 001 | 003 | 1 | 10 | year | end of fiscal year | 001-003 | |
| 2 | QV5 | 339 | 004 | 005 | 1 | 5 | year | end of year | (004-005) -> BKPF -> BUKRS | |
| 3 | QV5 | 339 | 006 | 008 | 1 | 8 | year | start of year | | "person names" |

In operation, each rule may be applied sequentially to the data request or the retrieved data directly. Further, each rule may be implemented as a combination of conditions. For example, the rules as illustrated in Table 1 may be a combination of conditions of client ID, file ID, retention time, and/or content. When all of these conditions are met, the data may be anonymized. However, if any of the conditions does not occur, the data is not anonymized. In one embodiment, the anonymization may include redacting a portion of the retrieved data with "XOXO." Alternatively, the anonymization may include encrypting a portion of the retrieved data so that it may not be deciphered unless authorized with a key to the encryption.

Figure 4:
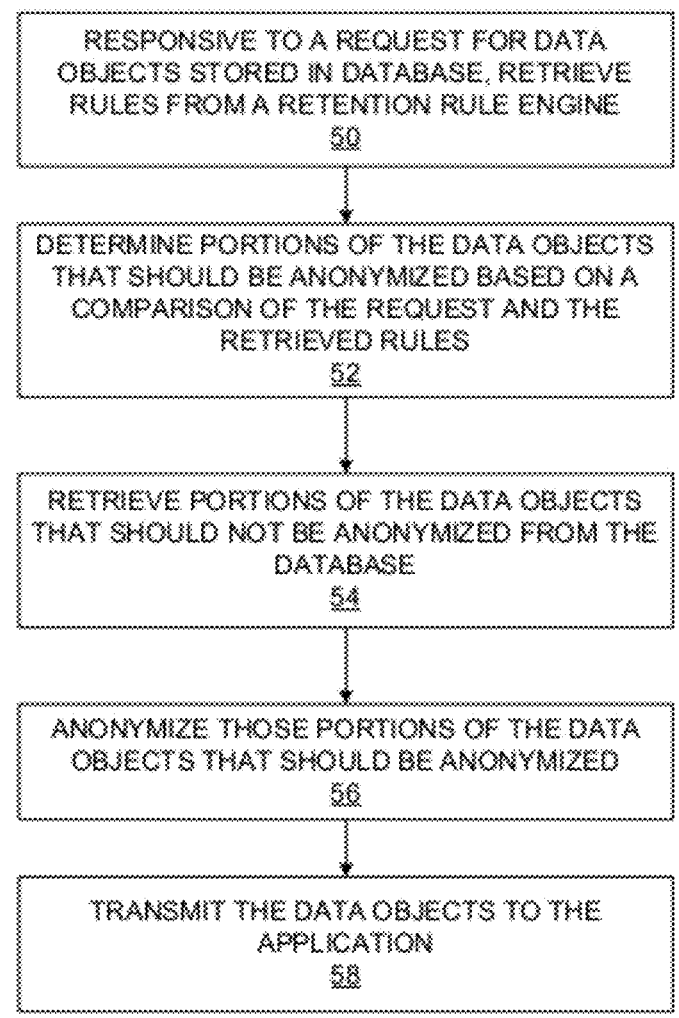
FIG. 4 illustrates a method of anonymizing data retrieved from databases according to an embodiment of the present invention.

FIG. 4 illustrates a method of anonymizing data retrieved from databases according to an embodiment of the present invention. At 50, in response to receiving a request from a business application for retrieving data objects stored in a database system, a processor of the database system such as the view processor 34 of the database system 14 may retrieve rules from a retention rule engine. The data objects may be data records, tables, or fields as described above. The request may include one or more identifiers to the data objects such as a range of identifiers to data records, tables, or fields. At 52, the processor may be configured to compare the request against the rules from the retention rule engine to determine portions of the data object that should be anonymized in according to the rules. Portions of the data objects may include certain part of the data objects. For example, if the requested data objects include a range of table identifiers, the determined portions may be a subset of the range of table identifiers or certain fields of the range of these identified tables. At 54, the processor may retrieve portions of the data objects that are not anonymized from a physical storage of the database system. At 56, the processor may execute an anonymizer program to label those portions of the data objects that are determined to be anonymized as anonymized. At 58, the data objects including the portions retrieved from the physical storage and the anonymized portions may be combined and transmitted to the business application.

Figure 5:
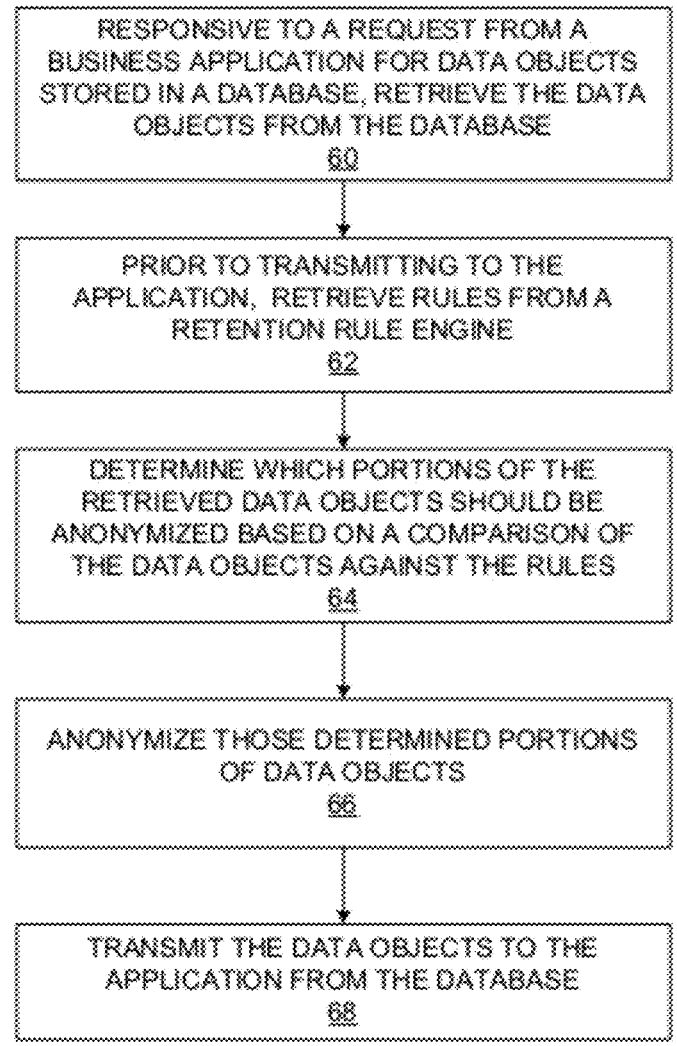
FIG. 5 illustrates another method of anonymizing data retrieved from databases according to an embodiment of the present invention.

FIG. 5 illustrates another method of anonymizing data retrieved from databases according to an embodiment of the present invention. At 60, in response to receiving a request from a business application for retrieving data objects stored in a database system, a processor of the database system such as the view processor 34 of the database system 14 may retrieve the requested data objects from a physical storage based on the request. The data objects may be data records, tables, or fields as described above. The request may include one or more identifiers to the data objects such as a range of identifiers to data records, tables, or fields. At 62, prior to transmitting the data objects retrieved from the physical storage to the business application, the processor may retrieve rules stored in a retention rule engine. At 64, the processor may be configured to determine which portions of the retrieved data objects should be anonymized based on a comparison of the data objects against the retrieved rules. Portions of the data objects may include certain part of the data objects. For example, if the requested data objects includes a range of table identifiers, the determined portions may be a subset of the range of table identifiers or certain fields of the range of these identified tables. At 66, the processor may execute an anonymizer program to anonymize those portions of the data object that are determined to be anonymized. At 68, the data objects including the portions retrieved from the physical storage and the anonymized portions may be combined and transmitted to the business application.

Figure 6:
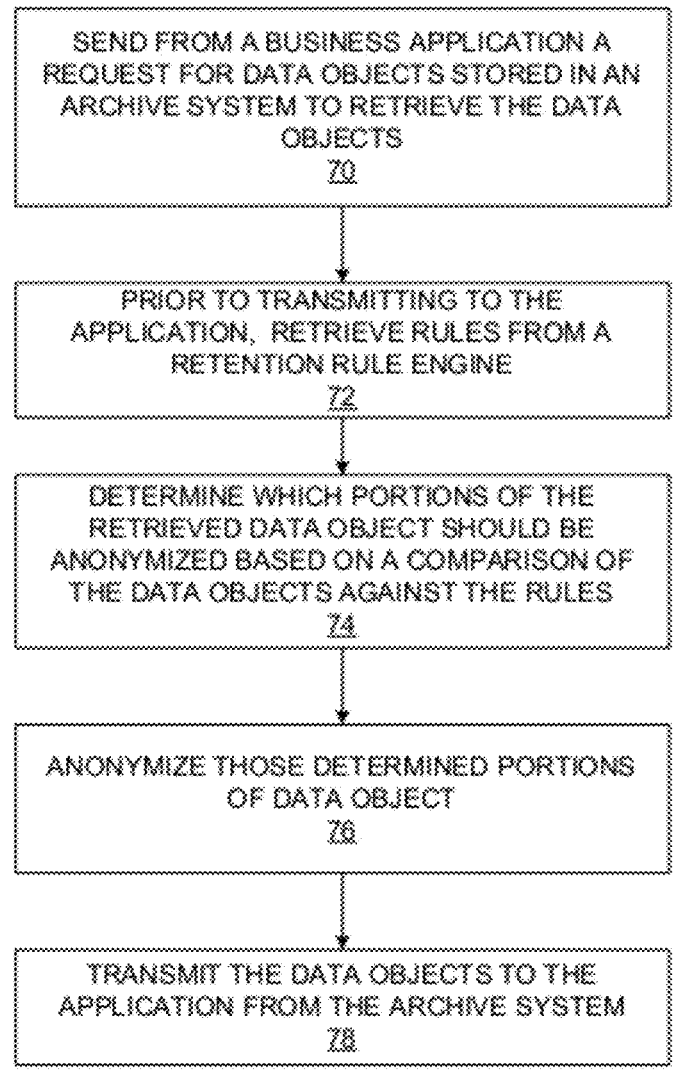
FIG. 6 illustrates a method of anonymizing data records retrieved from a data archive according to an embodiment of the present invention.

Similar methods may be used to anonymize data objects retrieved from long-term archive systems. FIG. 6 illustrates a method of anonymizing data records retrieved from a long-term storage archive to an exemplary embodiment of the present invention. At 70, in response to receiving a request, from a business application, for retrieving data objects stored in an archive system, a processor such as processor 12 as illustrated in FIGS. 1 and 3 may retrieve the requested data objects from a physical storage of the archive system based on the request. At 72, prior to transmitting the data objects retrieved from the physical storage to the business application, the processor may retrieve rules stored in a retention rule engine. At 74, the processor may be configured to determine which portions of the retrieved data objects should be anonymized based on a comparison of the data objects against the retrieved rules. At 76, the processor may execute an anonymizer program to anonymize those portions of the data objects that are determined to be anonymized. At 78, the data objects including the portions retrieved from the physical storage and the anonymized portions may be combined and transmitted to the business application.

Similarly, embodiments of the present invention may be used to pre-process business data sampled from database systems or data archive for software testing so that portions of the business data may be anonymized based on rules imposed by regulations and laws before being converted into test data.

Although the present invention has been described with reference to particular examples and embodiments, it is understood that the present invention is not limited to those examples and embodiments. Further, those embodiments may be used in various combinations with and without each other. The present invention as claimed therefore includes variations from the specific examples and embodiments described herein, as will be apparent to one of skill in the art.

What is claimed is:

1. A computer-implemented method of anonymizing business data, comprising:
 responsive to a request from an application of a server for data objects stored in a database system, retrieving, by a processor residing on the database system from a rule engine residing on the server, pre-determined rules based on which portions of the data objects are anonymized, wherein the request includes key words to be anonymized, and the rules include a rule of anonymizing contents that match the key words and that have been stored beyond a retention time;
 comparing, by the processor, the request against the rules to determine first portions of the data objects that are to be anonymized and second portions of the data objects that are not to be anonymized based on the contents that have been stored beyond a retention time;
 retrieving, by the processor, the second portions of the data objects from a storage of the database system;
 anonymizing, by the processor, the first portions of the data objects; and
 transmitting, by the processor, the data object including the first and second portions to the application.

2. The method of claim 1, wherein the data objects are hierarchically stored in the database system, including identifiers of at least one of records, tables, and fields, wherein records include identifiers of tables, and tables include identifiers of fields.

3. The method of claim 1, wherein the request includes identifiers of at least one of records, tables, and fields that are requested by the business application.

4. The method of claim 1, wherein the conditions of the rules include the retention time to retain a plurality of data objects stored in the database system.

5. The method of claim 1, wherein the anonymizing includes one of redacting the first portions and encrypting the first portions of the data objects.

6. The method of claim 1, wherein the anonymized business data is used for testing the application.

7. The method of claim 1, wherein the processor resides in the database system.

8. A computer-implemented method of anonymizing business data, comprising:
 responsive to a request from an application of a server for data objects stored in a database system, retrieving, by a processor residing on the database system, the data objects from a non-transitory storage of the database system;
 prior to transmitting the data objects to the application, retrieving, by the processor from a rule engine residing on the server, pre-determined rules based on which portions of the data objects are anonymized, wherein the request includes key words to be anonymized, and the rules include a rule of anonymizing contents that match the key words and that have been stored beyond a retention time;
 comparing, by the processor, the data objects against the rules to determine portions of the data objects that are to be anonymized based on the contents that have been stored beyond a retention time;
 anonymizing, by the processor, the portions of the data objects; and
 responsive to anonymizing, transmitting, by the processor, the data object to the application.

9. The method of claim 8, wherein the data objects are hierarchically stored in the database system, including identifiers of at least one of records, tables, and fields, wherein records include identifiers of tables, and tables include identifiers of fields.

10. The method of claim 8, wherein the request includes identifiers of at least one of records, tables, and fields that are requested by the business application.

11. The method of claim 8, wherein the conditions of the rules include the retention time to retain a plurality of data objects stored in the database system.

12. The method of claim 8, wherein the anonymizing includes one of redacting the portions and encrypting the portions of the data objects.

13. The method of claim 8, wherein the anonymized business data is used for testing the application.

14. The method of claim 8, wherein the processor resides on the database system.

15. A system for anonymizing business data, comprising:
a server including:
  a processor configured with an application; and
  a rule engine; and
a database system including a view processor and a non-transitory storage,
wherein the view processor is configured to:
  responsive to a request from the application for data objects stored in the database system, retrieve from the rule engine pre-determined rules based on which portions of the data objects are anonymized, wherein the request includes key words to be anonymized, and the rules include a rule of anonymizing contents that match the key words and that have been stored beyond a retention time;
  compare the request against the rules to determine first portions of the data objects that are to be anonymized and second portions of the data objects that are not to be anonymized based on the contents that have been stored beyond a retention time;
  retrieve second portions of the data objects from the non-transitory storage;
  anonymize the first portions of the data objects; and
  transmit the data object including the first and second portions to the application.

16. A system for anonymizing business data, comprising:
a server including:
  a processor configured with an application; and
  a rule engine; and
a database system including a view processor and a non-transitory storage,
wherein the view processor is configured to:
  responsive to a request from the application for data objects stored in the database system, retrieve the data objects from the non-transitory storage;
  prior to transmitting the data objects to the application, retrieve from the rule engine pre-determined rules based on which portions of the data objects are anonymized, wherein the request includes key words to be anonymized, and the rules include a rule of anonymizing contents that match the key words and that have been stored beyond a retention time;
  compare the request against the rules to determine portions of the data objects that are to be anonymized based on the contents that have been stored beyond a retention time;
  anonymize the portions of the data objects; and
  transmit the data object to the application.

17. A machine-readable non-transitory medium stored thereon executable codes that when executed, perform a method of anonymize business data, the method comprising:
responsive to a request from an application of a server for data objects stored in a database system, retrieving from a rule engine residing on the server pre-determined rules based on which portions of the data objects are anonymized, wherein the request includes key words to be anonymized, and the rules include a rule of anonymizing contents that match the key words and that have been stored beyond a retention time;
comparing the request against the rules to determine first portions of the data objects that are to be anonymized and second portions of the data objects that are not to be anonymized based on the contents that have been stored beyond a retention time;
retrieving second portions of the data objects from a non-transitory storage of the database system;
anonymizing the first portions of the data objects; and
transmitting the data object including the first and second portions to the application.

18. A machine-readable non-transitory medium stored thereon executable codes that when executed, perform a method of anonymize business data, the method comprising:
responsive to a request from an application of a server for data objects stored in a database system, retrieving the data objects from a non-transitory storage of the database system;
prior to transmitting the data objects to the application, retrieving, from a rule engine residing on the server, pre-determined rules based on which portions of the data objects are anonymized, wherein the request includes key words to be anonymized, and the rules include a rule of anonymizing contents that match the key words and that have been stored beyond a retention time;
comparing the request against the rules to determine portions of the data objects that are to be anonymized based on the contents that have been stored beyond a retention time;
anonymizing the portions of the data objects; and
transmitting the data object to the application.

* * * * *